UNITED STATES PATENT OFFICE.

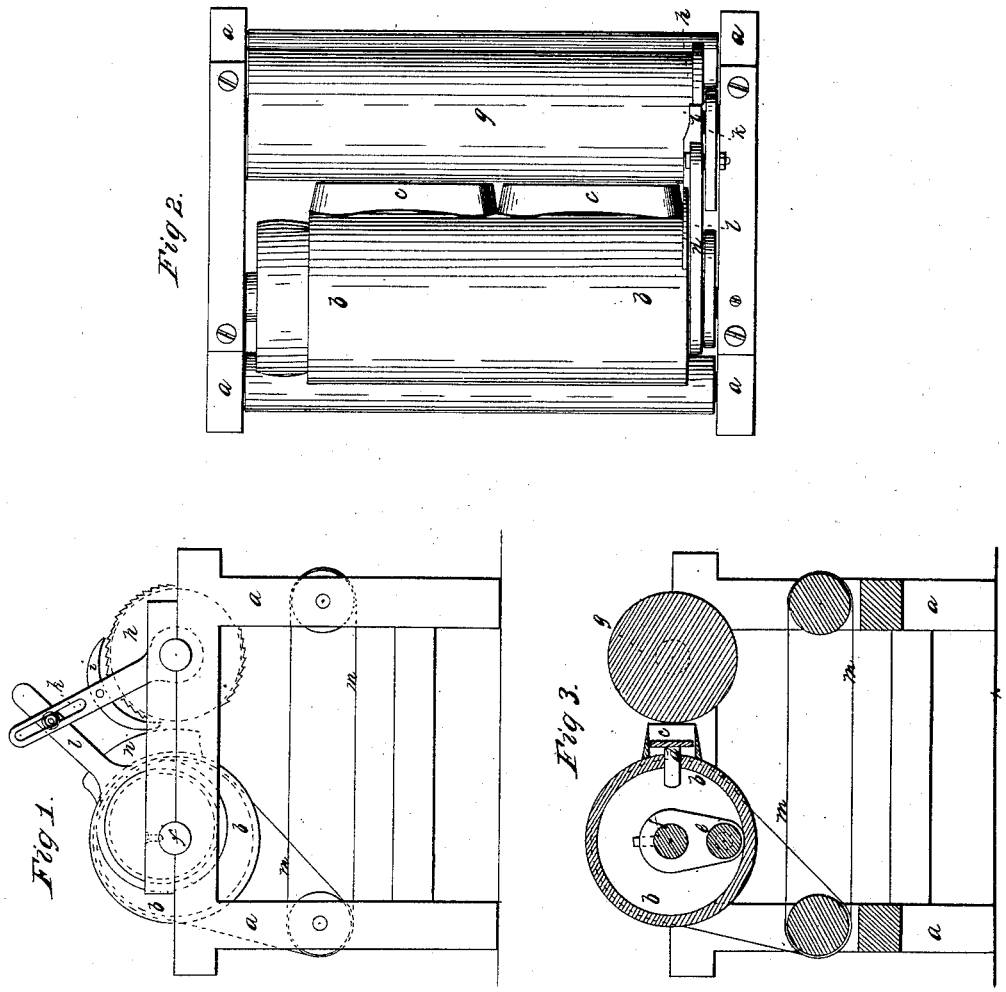

STEPHEN THURSTON, OF NEWARK, NEW JERSEY, ASSIGNOR TO HIMSELF, MARCUS L. WARD, AND HUNTINGTON & CO., OF SAME PLACE.

MACHINE FOR CUTTING INDIA-RUBBER, GUTTA-PERCHA, AND OTHER BOOT AND SHOE SOLES.

Specification of Letters Patent No. 17,408, dated May 26, 1857.

*To all whom it may concern:*

Be it known that I, STEPHEN THURSTON, of the city of Newark and State of New Jersey, have invented certain new and useful Apparatus for Cutting the Soles of India-Rubber, Gutta-Percha, and other Shoes, &c.; and I do hereby declare the following to describe and ascertain the same, reference being had to the accompanying drawing, in which—

Figure 1, is a side elevation, Fig. 2, a plan, Fig. 3, a sectional view.

My device is for the purpose of facilitating the manufacture of india rubber shoes and similar articles of rubber gutta percha and facilitates said manufacture in a considerable degree cutting out a larger number of soles with the labor of a single hand than could by any means heretofore used be done by many men.

The construction of the apparatus is as follows:

On a suitable frame $a$, $a$, I hang a horizontal cylinder $b$ of sufficient diameter, on the periphery of which there is the cutter or cutters $c$ just the shape of the sole of a shoe to be cut. In the recess within these cutters I place a follower, $d$. This is flat and just the shape of the article to be cut; the followers $d$, one of which is connected with each of the cutters are projected into the interior of the cylinder $b$, so to to be acted upon by a cam $e$. On the interior this cam is affixed to the central shaft $f$ on which the cylinder $b$ revolves loosely the shaft itself being stationary—thus when the cylinder turns around the followers are thrust out by the action of the cam with which they come in contact and force the sole which has been previously cut from the cutters upon a revolving apron to be hereafter named.

Parallel with the cutting cylinder and in the same horizontal plane with it I hang another plain cylinder smooth on its surface against which the cutters come in contact to cut whatever comes between them—this second cylinder $g$ has a ratchet wheel $h$ at one end of it and into this a pawl $i$ takes to retrograde it as hereafter to be explained—the pawl $i$ is attached to an arm $k$ extending from the axis of cylinder $g$ on which it loosely turns, and this arm $k$ is connected near its outer end with another arm $l$ that projects from an eccentric-band surrounding an eccentric $x$. Affixed to the axis of the cutter cylinder, the effect of which is to move the cylinder backward a short distance at every revolution of the cutting cylinder when the knives are not in contact therewith just before the knives come in contact with cylinder $g$, a cam $n$ on cylinder $b$ strikes the tail of the pawl $i$ and raises it from the ratchet $h$ leaving cylinder $g$ to be turned by the cutter during its contact with said cylinder; the distance which the cutter carries the cylinder around is too great to bring the article being cut into proper position for the neat cut and hence the necessity of the retrograde motion effected by the pawl $i$ the distance to which this motion is carried is regulated by the point of connection between levers $l$ and $k$ so as to suit the work to be done.

There is an endless apron $m$ that traverses below the cutting cylinders upon which the cut soles are deposited and upon which they are borne away so as not to have a second sole come in contact with them as if two soles touch each other while in the state they then are they adhere and the work upon them is lost. The apron is driven by a band from the cutting cylinder $b$.

The operation of the machine is as follows: A sheet of prepared india rubber or gutta percha upon which has been stamped at proper intervals the manufacturer's name and style, the patent date &c., is laid upon the feeding cylinder $g'$ and passes down between it and the cutting cylinder until one of the stamps are brought opposite the point where the cutter in its revolution will properly strike it, at which time the pawl $i$ is raised from the ratchet $h$ by the cam $n$ that strikes it as seen in Fig. 1, then the cutter coming in contact with cylinder $g$ causes $g$ to revolve with it till the sole is completely cut out, it then passes onward, leaving cylinder $g$ at rest, and dropping the pawl $i$ into the teeth of the ratchet. The followers, when the cutters have reached the lowest point of their revolution are thrust out by the cam $c$ and drop the shoe sole upon the apron, as the cylinder continues to turn the eccentric causes the cylinder $g$ to back sufficiently to bring the next succeeding stamp upon the india rubber cloth into proper position to be cut, this motion is essential to save the wasting of material and to make the cuts close to each other, as well as to bring the stamps right—at each succeeding revolution there is one or more soles cut, and dropped upon the apron *m* which moves on and carries them beyond the danger of contact with their successors.

Having thus fully described my improvements in forming the soles of shoes of india rubber, gutta-percha, &c., what I claim therein as new and for which I desire to secure Letters Patent is—

The combination and arrangement of the cutter cylinder and carrying cylinder (*g*) substantially as above specified the cylinder (*g*) being moved forward by the action of the cutters upon it and moved backward by the eccentric on the cutting cylinder in the manner and for the purposes set forth.

STEPHEN THURSTON.

Witnesses:
WM. CHAUNCY LANGDON,
J. WAGH.